United States Patent
Prabha et al.

(10) Patent No.: US 9,996,067 B2
(45) Date of Patent: Jun. 12, 2018

(54) METHOD AND SYSTEM FOR INDICATING ENERGY SAVINGS FOR A DISTRIBUTED SITE

(71) Applicant: Wipro Limited, Bangalore (IN)

(72) Inventors: Baburaj Kaimalilputhenpura Prabha, Calicut (IN); Joy Banerjee, Durgapur (IN); Har Amrit Pal Singh Dhillon, Gurgaon (IN); Parminder Singh, Gurgaon (IN); Dinesh Kumar Pathak, Ghaziabad (IN)

(73) Assignee: CARRIER CORPORATION, Farmington, CT (US)

( * ) Notice: Subject to any disclaimer, the term of this patent is extended or adjusted under 35 U.S.C. 154(b) by 0 days. days.

(21) Appl. No.: 15/065,064

(22) Filed: Mar. 9, 2016

(65) Prior Publication Data
US 2017/0207623 A1    Jul. 20, 2017

(30) Foreign Application Priority Data
Jan. 20, 2016 (IN) .............................. 201641002172

(51) Int. Cl.
G06F 19/00    (2018.01)
G05B 15/02    (2006.01)
H02J 3/00     (2006.01)

(52) U.S. Cl.
CPC .............. *G05B 15/02* (2013.01); *H02J 3/00* (2013.01)

(58) Field of Classification Search
CPC ................................ G05B 15/02; H02J 3/00
See application file for complete search history.

(56) References Cited

U.S. PATENT DOCUMENTS

| | | | |
|---|---|---|---|
| 7,216,021 B2 | 5/2007 | Matsubara et al. | |
| 8,321,188 B2 * | 11/2012 | Johnson | G06Q 10/06 703/6 |
| 2006/0065750 A1 * | 3/2006 | Fairless | F23N 5/203 236/46 R |
| 2012/0022700 A1 * | 1/2012 | Drees | G05B 15/02 700/276 |
| 2012/0067560 A1 * | 3/2012 | Bergman | F24F 11/006 165/238 |
| 2012/0221163 A1 * | 8/2012 | Forbes, Jr. | G06Q 10/00 700/295 |

(Continued)

*Primary Examiner* — Michael D Masinick
(74) *Attorney, Agent, or Firm* — Cantor Colburn LLP

(57) ABSTRACT

The present disclosure relates to a method and system for indicating energy savings for a distributed site. The energy savings is indicated by an energy management system, which receives energy consumption data of the distributed site for a first observation period. Further one or more service windows are defined for the distributed site and an energy saving strategy is applied to at least one service window. Further, the energy consumption data for the second observation period is received and a compared of one or more service windows of the first observation period with the corresponding service windows of the second observation period is done. The energy management system further determines adjustment factors in the energy profiles based on parameters affecting the energy profiles which were not considered during the first observation period and hence indicate the energy savings for the distributed site based on the first saving and adjustment factor.

15 Claims, 8 Drawing Sheets

(56) References Cited

U.S. PATENT DOCUMENTS

| | | | | |
|---|---|---|---|---|
| 2013/0184885 A1* | 7/2013 | Keil | ................... | G05B 19/02 |
| | | | | 700/291 |
| 2013/0231792 A1* | 9/2013 | Ji | ................... | G05B 19/02 |
| | | | | 700/291 |
| 2013/0289952 A1* | 10/2013 | Marwah | ................... | G06Q 10/04 |
| | | | | 703/2 |
| 2015/0119058 A1* | 4/2015 | Rune | ................... | H04W 72/048 |
| | | | | 455/452.1 |
| 2015/0154618 A1* | 6/2015 | Forbes, Jr. | ................... | G06Q 10/00 |
| | | | | 705/7.29 |
| 2015/0247646 A1* | 9/2015 | Song | ................... | F24F 11/006 |
| | | | | 700/276 |
| 2015/0303691 A1* | 10/2015 | Forbes, Jr. | ................... | G06Q 10/00 |
| | | | | 700/295 |

\* cited by examiner

12 # METHOD AND SYSTEM FOR INDICATING ENERGY SAVINGS FOR A DISTRIBUTED SITE

FIELD OF THE INVENTION

The present subject matter is related in general to energy management, more particularly but not exclusively to a method and system for indicating energy savings for distributed sites.

BACKGROUND

With the ever increasing consumption of energy on the commercial front, a keen focus has been given to energy management and savings. Energy efficiency offers the largest and most cost-effective opportunity for both industrialized and developing nations to limit the enormous financial, health and environmental costs associated with energy consumption. Presently, the International Performance Measurement and Verification Protocol (IPMVP) is one of the protocols used for energy savings and measurement which offers numerous options for computing the energy savings across different sectors. However, in an environment where energy savings are generated purely on account of Operational Energy Efficiency, measures like schedule management, set-point management, asset performance management, capacity management and options offered by the IPMVP protocol are not suitable. This becomes even more difficult where the distributed sites utilizing the energy power have distinct service windows for business hours, setup, shut-down and non-business hours. In such cases, the operational savings measures implemented in one or more services windows can be nullified by energy consumption increase in other service windows. Specifically, situations where business hours consumption is significantly higher in proportion to non-business hours, the savings in non-business hours can be nullified by even small change in business hour consumption.

Thus, in the existing scenario there is a lack of understanding and appreciation of the benefits of energy efficiency or savings strategies among various segments like restaurants, banks etc. Although, information about the energy consumption data is provided to the users, there are no ways in the existing system for indicating the energy savings to the users. Thus there is a need for a method to monitor the energy utilization pattern for a distributed site and help in devising the most effective energy saving strategy for the distributed site.

SUMMARY

Disclosed herein is a method and system for indicating energy savings for a distributed site. The indication for energy savings is given by an energy management system. The energy management system observes the energy utilization pattern of a distributed site for a specific period of time and indicates the energy savings for a distributed site by applying an energy saving strategy to the distributed site.

In an embodiment, the present disclosure relates to a method for indicating energy savings for a distributed site. The method comprises receiving energy consumption data from a pre-defined area of the distributed site for a first observation period and defining one or more service windows for the distributed site during its operation. Each of the service windows comprises unique energy profiles for the pre-defined area of the distributed site. The method comprises applying energy saving strategy for at least one service window based on the energy profiles, from the one or more service windows, receiving energy consumption data from the pre-defined area of the distributed site for a second observation period, comparing the energy consumption data of the one or more service windows of the first observation period with the corresponding energy consumption data of the one or more service windows of the second observation period to obtain a saving factor, determining adjustments factors in the energy profiles based on parameters affecting the energy profiles which were not considered during the first observation period and indicating energy savings for the distributed site based on the saving factor and the adjustment factors.

In an embodiment, the present disclosure relates to an energy management system for indicating the energy savings for a distributed site. The energy management system comprises a processor and a memory communicatively coupled to the processor, wherein the memory stores processor executable instructions, which, on execution, causes the energy management system to receive energy consumption data from a pre-defined area of the distributed site for a first observation period and define one or more service windows for the distributed site during its operation. Each of the service windows comprises unique energy profiles for the pre-defined area of the distributed site. The energy management system applies energy saving strategy for at least one service window, based on the energy profiles, from the one or more service windows, receive energy consumption data from the pre-defined area of the distributed site for a second observation period, compares the energy consumption data of the one or more service windows of the first observation period with the corresponding energy consumption data of the one or more service windows of the second observation period to obtain a saving factor, determines adjustments factors in the energy profiles based on parameters affecting the energy profiles which were not considered during the first observation period; and indicates energy savings for the distributed site based on the saving factor and the adjustments factors.

In an embodiment, the present disclosure relates to a non-transitory computer readable medium including instructions stored thereon that when processed by at least one processor cause an energy management system to receive energy consumption data from a pre-defined area of the distributed site for a first observation period, define one or more service windows for the distributed site during its operation, wherein each of the service window comprises unique energy profiles for the pre-defined area of the distributed site, apply energy saving strategy for at least one service window, based on the energy profiles, from the one or more service windows, receive energy consumption data from the pre-defined area of the distributed site for a second observation period, compare the energy consumption data of the one or more service windows of the first observation period with the corresponding energy consumption data of the one or more service windows of the second observation period to obtain a saving factor, determine adjustments factors in the energy profiles based on parameters affecting the energy profiles which were not considered during the first observation period and indicate energy savings for the distributed site based on the saving factor and the adjustments factors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
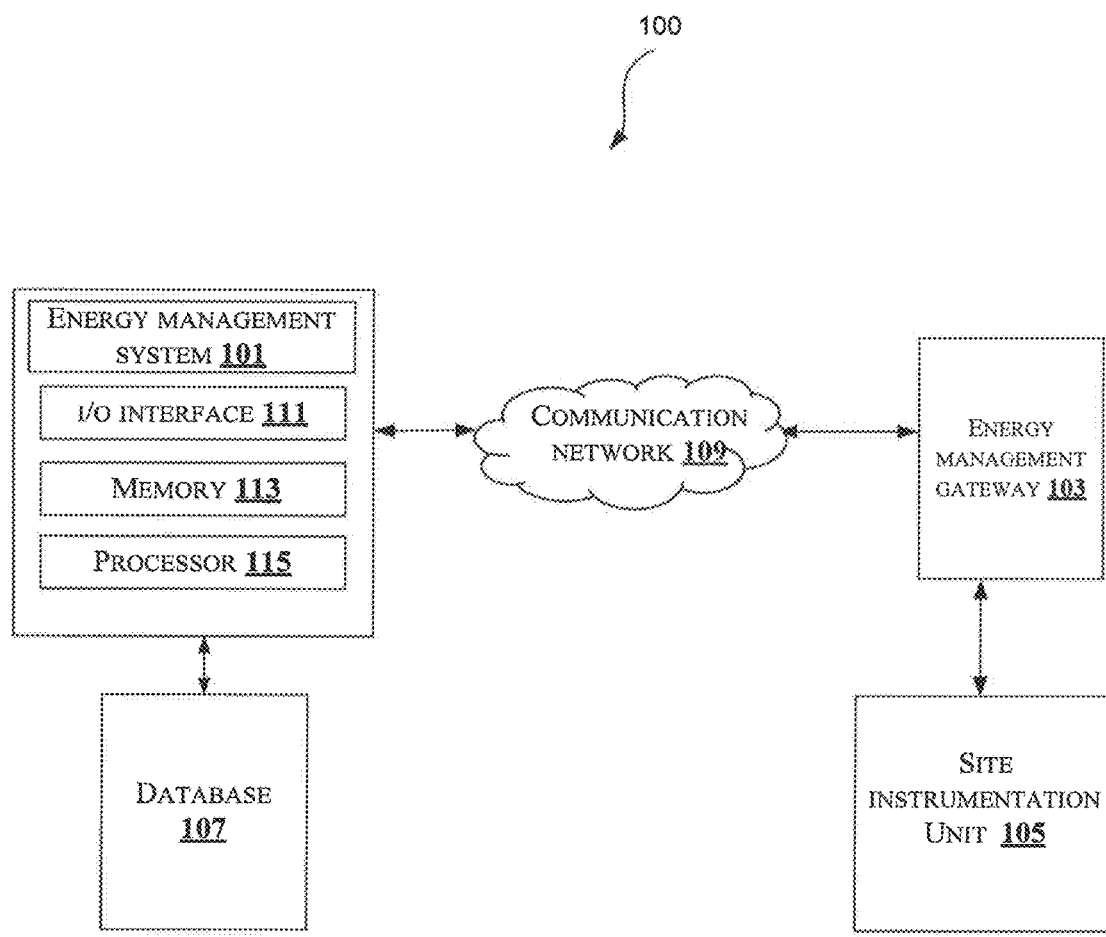
FIG. 1a shows an exemplary environment for indicating energy savings for a distributed site in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for indicating energy savings for a distributed site. The present disclosure provides an energy management system which indicates the energy savings for a distributed site based on an observation of energy consumption data for a pre-defined area of the distributed site for a first observation period. The energy consumption data is observed for the various assets of the distributed site. In an embodiment, the site assets associated with the distributed site include one or more equipment which consumes energy. In an embodiment, the present disclosure applies an energy saving strategy to at least one service window, wherein the energy saving strategy includes minimization of energy usage for the assets which are not required at a particular time interval. Further, in the present disclosure the energy consumption data for the second observation period is observed, wherein the energy saving strategy is deployed during the second observation period for the associated site assets. The energy management system indicates the energy savings for the distributed site by comparing the energy consumption data for first observation period with the energy consumption data for the second observation period. In such a way, energy savings for the distributed site is indicated which helps in detecting the most effective energy saving strategy for the distributed site.

FIG. 1a shows an exemplary environment for indicating energy savings for a distributed site in accordance with some embodiments of the present disclosure.

Figure 1B:
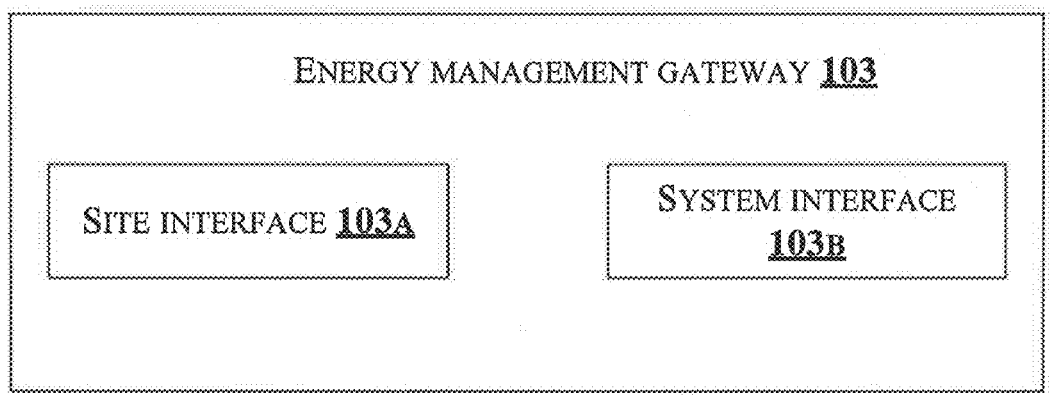
FIG. 1b shows a block diagram illustrating an energy management gateway in accordance with some embodiments of the present disclosure.
Figure 1C:
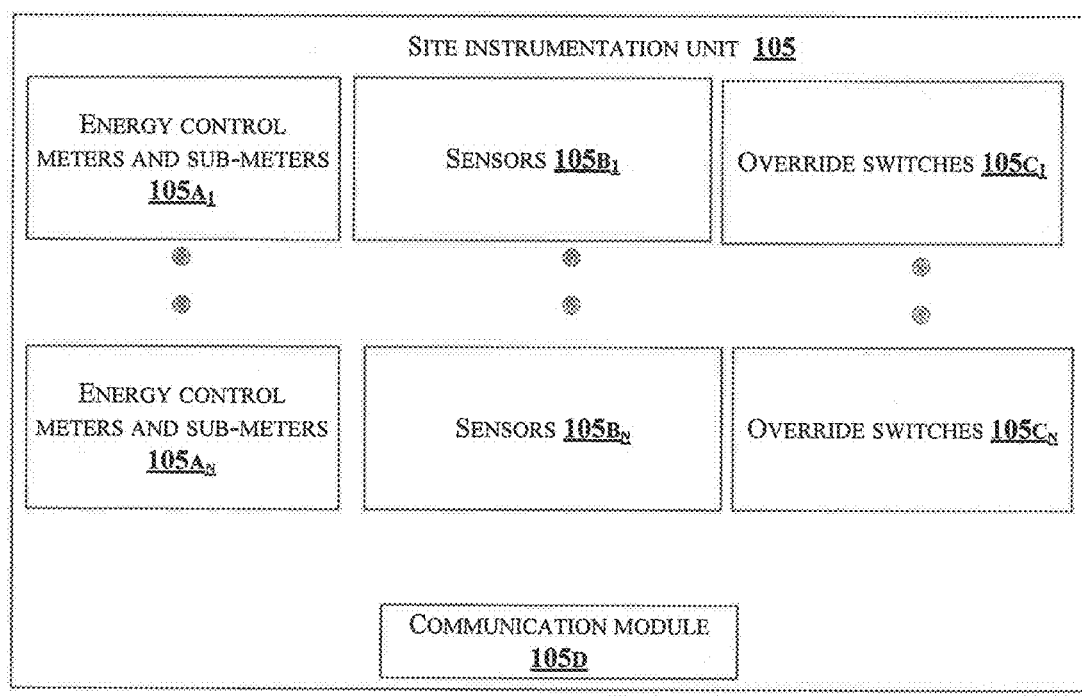
FIG. 1c shows a block diagram illustrating site instrumentation unit in accordance with some embodiments of the present disclosure.
Figure 1D:
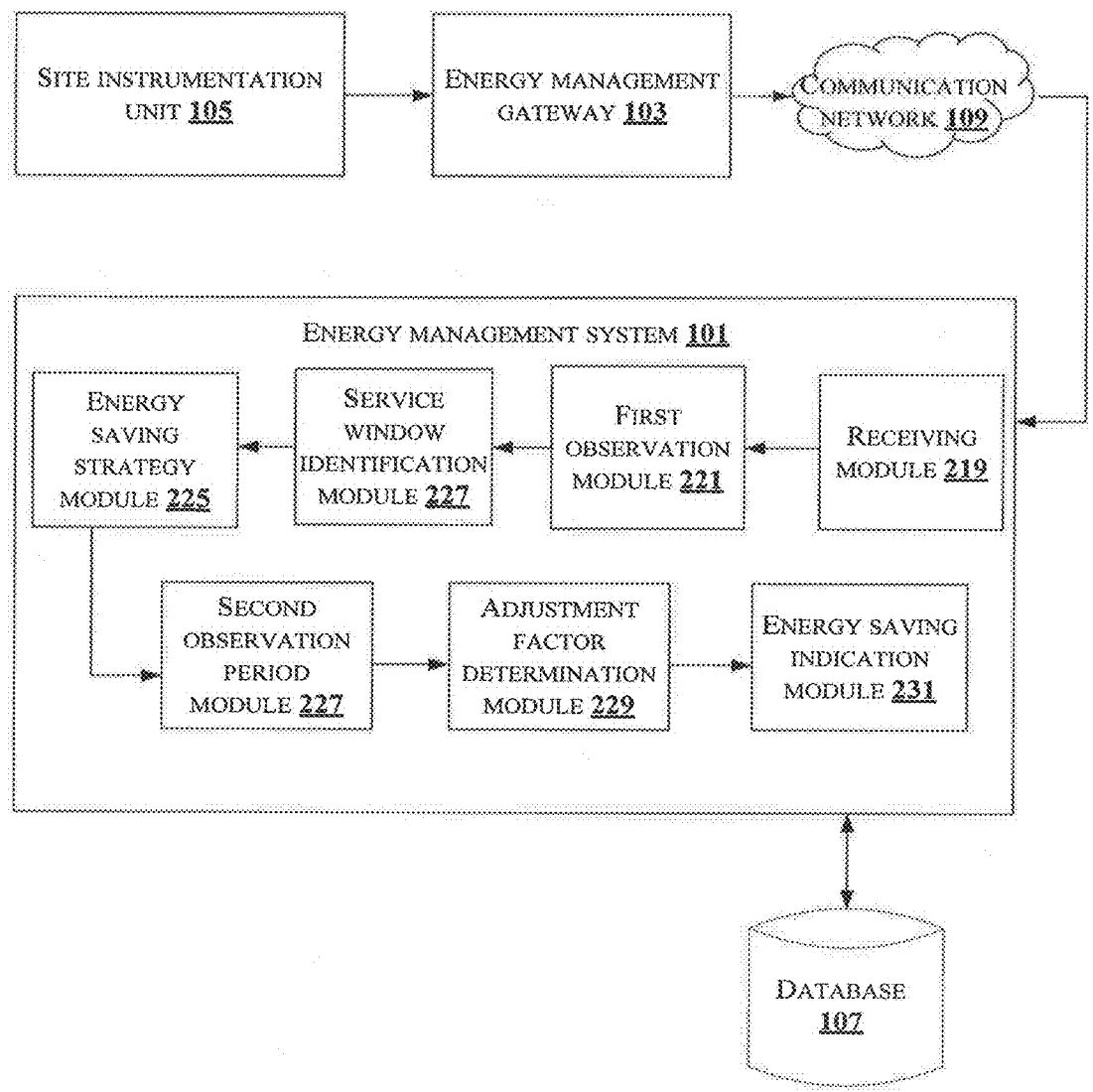
FIG. 1d shows an exemplary environment illustrating data flow between different modules of the energy management system with energy management gateway and site instrumentation unit in accordance with some embodiment of the present disclosure.

As shown in FIG. 1a, the environment 100 comprises an energy management system 101, an energy management gateway 103 interconnected through a wired or wireless communication network 109. The energy management gateway 103 is connected to a site instrumentation unit 105. The energy management system 101 is connected to a database 107. The database 107 comprises the energy consumption data received for the distributed site, energy saving strategy, one or more adjustments factors, saving factors etc. The energy management system 101 indicates energy savings for a distributed site by identifying the most effective energy saving strategy for the distributed site. The distributed site may include, but is not limited to, Banks, Quick Service Restaurants (QSR) etc. The energy management system 101 receives the energy consumption data for a pre-defined area of the distributed site for a first observation period. In an embodiment, the first observation period is the time interval during which the energy consumption data for a site is observed. The energy consumption data is received by the energy management gateway 103 from the site instrumentation unit 105 which is installed at the distributed site location. As shown in FIG. 1*c*, the site instrumentation unit 105 comprises energy control meters and sub-meters 105A$_1$ . . . to 105A$_N$ (collectively referred as 105A), sensors 105B$_1$ . . . to 105B$_N$ (collectively referred as 105B), override switches 105C1 . . . to 105C$_N$ (collectively referred as 105C) and a communication module 105D. The energy control meters and sub-meters 105A include, for example, grid meters, Distributed Generation (DG) meters, light meters, assets level meters, Heating, Ventilation and Air Conditioning HVAC meters etc. The energy control meters and sub-meters 105A, collect the energy consumption data for the distributed sites. The sensors 105B installed at the distributed site include temperature sensors, thermostat, photo sensors etc., which are used to sense particular condition in the distributed site. The temperature sensors 105B are used for detecting any temperature changes in the pre-defined areas of the distributed site. The override switches 105C include information about the switches and the area of the site which are set to override from a defined time period manually depending on the need of the distributed site. Further, the site instrumentation data is received by the energy management gateway 103. The energy management gateway 103 is an interface between the distributed sites and the energy management system 101. The energy management gateway 103 includes a system interface 103B and a site interface 103A as shown in FIG. 1*b*. The system interface 103B transmits the data received from the site instrumentation unit 105 to the energy management system 101 through at least one of wired or wireless communication network 109 which can include, but not limited to GSM/GPRS, Wi-Fi, and Ethernet etc. The site interface 103A collects information about the energy usage of the distributed sites from the site instrumentation unit 105 of the distributed sites. Based on the received data from the distributed sites, the energy management system 101 identifies one or more service windows for the distributed site depending on the type of the distributed site. The service windows are the framework which identifies unique energy profiles for the distributed site depending on the type of the site. The energy management system 101 determines energy saving strategy for the distributed site based on the energy utilization patterns of the sites. The energy saving strategy is applied to the second observation period based on the observations of the first observation period. Further, the energy management system 101 determines a saving factor which indicates the reduction of power consumptions for the one or more assets of the distributed site. The energy management system 101 further determines one or more adjustments factors for the distributed sites. The adjustment factors define major changes in the energy profiles of the distributed site based on any changes done at the distributed site. In an embodiment, the change in the energy profile can be due to any addition and deletion of one or more assets which consume energy. Further, based on the adjustment factors and the saving factor obtained, the energy management system 101 indicates the energy savings for the distributed site. The flow of the energy consumption data from the site instrumentation unit 105 to the energy management system 101 through energy management gateway 103 is illustrated in FIG. 1*d*.

The energy management system 101 comprises an I/O Interface 111, a memory 113 and a processor 115. The I/O interface 111 is configured to receive the energy consumptions data for the pre-defined area of the distributed sites for the first and second observation period The received information from the I/O interface 111 is stored in the memory 113. The memory 113 is communicatively coupled to the processor 115 of the energy management system 101. The memory 113 stores processor instructions which cause the processor 115 to execute the instruction in order to indicate the energy savings for the distributed sites.

Figure 2:
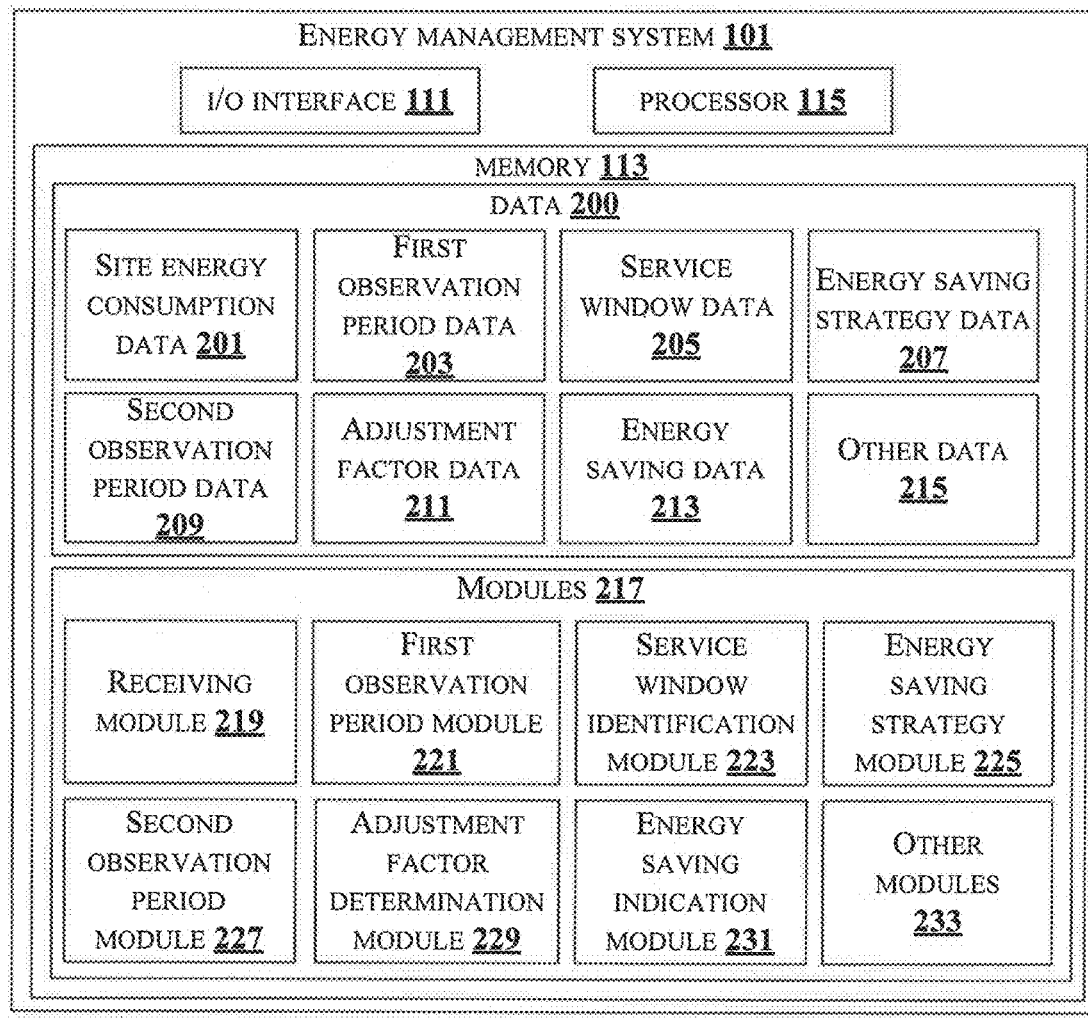
FIG. 2 shows a detailed block diagram illustrating an energy management system in accordance with some embodiments of the present disclosure.

FIG. 2 shows a detailed block diagram illustrating an energy management system in accordance with some embodiments of the present disclosure.

In the illustration FIG. 2, the one or more data 200 and the one or more modules 217 stored in the memory 113 are described herein in detail. In an embodiment, the data 200 includes site energy consumption data 201, first observation period data 203, service window data 205, energy saving strategy data 207, second observation period data 209, adjustment factor data 211, energy saving data 213 and other data 215 for indicating the energy savings for a distributed site.

The site energy consumption data 201 comprises data associated with the energy consumption for the distributed site. The energy consumption data is collected by the site instrumentation unit 105 located at the distributed site. The site energy consumption data 201 also includes data from various sensors 105B like temperature sensors, photo sensors, motion sensor etc., which collect information of the pre-defined area of the distributed site. The site energy consumption data 201 further includes the override data associated with the operation of different assets of the distributed site. The override function is carried out manually by the users depending upon the need of the distributed site.

The first observation period data 203 comprises data associated with the energy consumption pattern for the pre-defined area of the distributed site for specified time duration. In an embodiment, the time duration for a distributed site for observing the energy consumption pattern may be one month. The first observation period data 203 includes the average consumption of the distributed site for one or more of the service windows. Further, the first observation period data 203 does not include the days during which the distributed site is closed and for the days when the distributed site is communicating less than a pre-defined value in order to arrive at higher accuracy level. For example, the pre-defined value for a site is taken as 92%.

The service window data 205 comprises information about the one or more service window defined for a pre-defined area of a distributed site during its operation. The service window data 205 further includes unique energy profiles for the distributed site. The unique energy profiles vary depending on the type of the distributed site. For example, the service windows for a bank sectors are bank setup hours, customer hours, closing hours etc.

The energy saving strategy data 207 comprises information about the strategy for saving the energy consumptions for the pre-defined area of the distributed sites. The energy saving strategy varies for the distributed site depending on the type of the site and the one or more service windows.

The second observation period data 209 comprises data associated with the energy consumption pattern for the pre-defined area of the distributed site, where the second observation period is initiated after applying the energy saving strategy for the one or more assets of the distributed sites. The energy saving strategy is deployed at various assets of the distributed site which further helps in energy savings for the distributed site.

The adjustment factor data 211 comprises information about the one or more adjustments done at the pre-defined area of the distributed site. The adjustment factor data 211 includes routine and non-routine adjustments for the distributed site. The routine adjustment comprises, for example, manual override adjustment, control back failure adjustment, weather adjustment etc. The manual override adjustment data includes information about the override of the pre-set time schedules for some of the assets of the distributed site like HVAC, lightning etc. The control back failure adjustment data includes information about the consumption of energy for the control back failure, when any timer based control fails because of any hardware issues. The weather adjustment data includes information about the changes in the mean temperature and the associated policy with respect to the consumption of energy. The non-routine adjustment data comprises operating schedule adjustment, out of boundary adjustment, working days in a year adjustment, format and area adjustment etc. The operating schedule adjustment data includes information about the changes in the site's business schedule like changes in business hours across distributed site etc. The out of boundary adjustment data includes information about any addition or modification in the boundary load which draws power from the distributed site. The working days in a year adjustment data comprises information about the major changes in the working days in the second observation period compared to the first observation period. The format and area adjustment data includes information about the change in the site's format or layout which has affected the energy consumption of the distributed site significantly.

The energy saving data 213 comprises information about the savings indicated for the distributed site. The energy savings for the distributed site is determined by the energy management system 101 based on the saving factor and the adjustment factor.

The other data 215 may store data, including temporary data and temporary files, generated by modules for performing the various functions of the energy management system 101.

In an embodiment, the one or more data 200 in the memory 113 are processed by the one or more modules 217 of the energy management system 101. The one or more modules 217 may be stored within the memory 113 as shown in FIG. 2. In an example, the one or more modules 217, communicatively coupled to the processor 115, may also be present outside the memory 113 and implemented as hardware. As used herein, the term module refers to an application specific integrated circuit (ASIC), an electronic circuit, a processor 115 (shared, dedicated, or group) and memory 113 that execute one or more software or firmware programs, a combinational logic circuit, and/or other suitable components that provide the described functionality.

In one implementation, the one or more modules 217 may include, for example, a receiving module 219, a first observation period module 221, a service window identification module 223, an energy saving strategy module 225, a second observation period module 227, an adjustment factor determination module 229, an energy saving indication module 231. The memory 113 may also comprise other modules 233 to perform various miscellaneous functionalities of the energy management system 101. It will be appreciated that such aforementioned modules may be represented as a single module or a combination of different modules.

The receiving module 219 receives the energy consumption data associated with the distributed site. The energy consumption for the distributed site is collected from the site's instrumentation unit 105 which comprises energy control meters and sub-meters 105A for recording the energy consumption. The receiving module 219 receives the energy consumption for the distributed site initially for the first observation period during which the energy consumption patterns for the distributed site is observed. The receiving module 219 further receives the energy consumption data during the second observation period when the energy saving strategy is deployed at the distributed site.

The first observation period module 221 observes the energy consumption pattern for the distributed site for pre-defined interval of time. The first observation period module 221 does not include the days during which the distributed site is closed and the days during which the distributed site communicates less than a pre-defined defined value in order to arrive at higher accuracy. The pre-defined value varies depending on the type of site. In an embodiment, pre-defined value for a site is 92%.

The service window identification module 223 identifies one or more service windows for the distributed site during its operation. In an embodiment, the types of service windows for a distributed site includes business hours, non-business hours, customers' hours, peak hours etc. The service window identifies unique energy profiles for the distributed site. The energy profiles for a distributed site depend on the type of the site. In an embodiment, the energy profiles may be the result of the business volume, the weather status, assets used etc. The energy profiles for the distributed site get repeated every day with a fair degree of consistency.

The energy saving strategy module 225 determines an energy saving strategy for a service window based on the energy profiles. The energy saving strategy is determined by the energy saving strategy module 225 based on the first observation period of the distributed site. The energy profiles for the pre-defined area of the distributed site is observed and the assets causing unnecessary usage of energy are noted and further the energy saving module 225 applies a strategy for at least one service window depending on the need of the energy.

The second observation period module 227 observes the energy computation data for the pre-defined area of the distributed site. The energy consumption data in the second observation period is observed after the energy saving strategy is applied. In an embodiment, the assets used in the pre-defined area of the distributed site in the second observation period are similar to the assets used in the first observation period.

The adjustment factor determination module 229 determines one or more adjustment factors in the energy profiles of the distributed site. The adjustment factor determination module 229 determines the adjustment factors by identifying the one or more assets which affect the energy profiles for the distributed site and which increase the energy consumption in the second observation period when compared to the first observation period. In an exemplary embodiment, the adjustment factor determination module 229 determines if there is any significant change in the weather status from the first observation period to the second observation period. The weather change in the second observation period can drastically increase or decrease the energy consumption data for the distributed site. In an embodiment, the weather adjustments are made in the first observation period consumption on account of change in the mean temperature and the associated policy with respect to the consumption. The adjustments are carried out to segregate the energy effects of the energy saving strategy from the effects of other simultaneous changes affecting the distributed site like addition of new equipment, weather changes etc.

The energy saving indication module 231 indicates the energy savings for the distributed site based on the adjustment factors determined and the saving factor obtained. The energy saving indication module 231 indicates energy saving for each of the pre-defined area of the distributed site which were under the observation of the energy management system 101.

Figure 3:
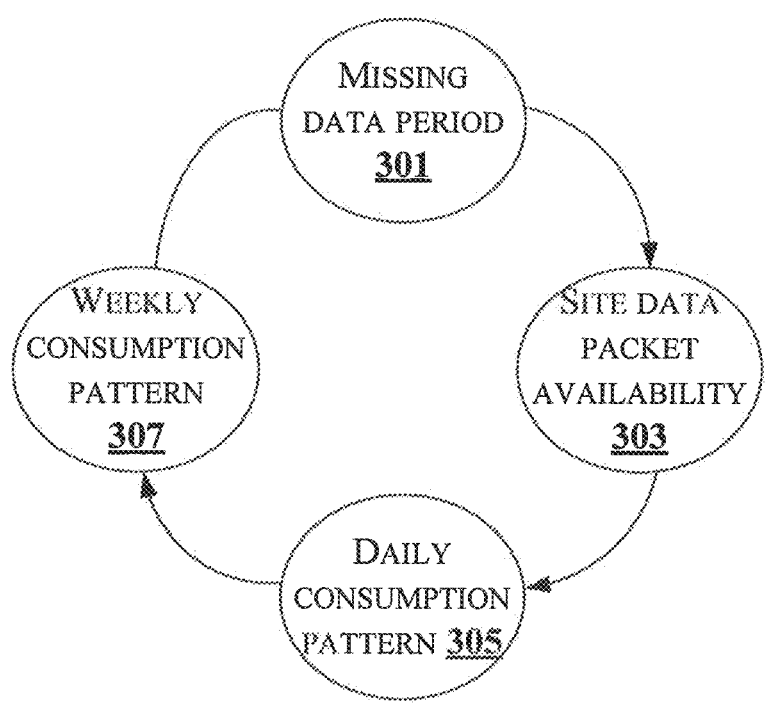
FIG. 3 illustrates a sequence diagram showing a method for validating the data of first and second observation period in accordance with some embodiments of present disclosure.

FIG. 3 illustrates a sequence diagram showing a method for validating the data of first and second observation period in accordance with some embodiments of present disclosure.

As illustrated in FIG. 3, the method comprises one or more blocks for validating the data received for the first and second observation period. The energy consumption data received for indicating the energy savings is first validated to check the data quality and availability before the energy savings are indicated for a distributed site. The validation of data is carried out before it is received for the first and second observation period. The validation of the energy consumption data is done based on a plurality of parameters namely missing data period 301, site data packet availability 303, daily consumption pattern 305 and weekly consumption pattern 307.

The missing data period 301 is a parameter wherein the energy management system 101 indicates the users whenever the distributed site communication fails for a specific period of time. In an embodiment, the missing data period 301 also includes the number of instances when the distributed site communication has failed.

In the site data packet availability 303, the energy management system 101 indicates the users, whenever the number of data packets received from the site instrumentation unit 105 is less than a threshold value. In a non-limiting embodiment, the threshold value defined for a distributed site for a day is 92%. Further, the site data packet availability 303 also includes information about the days during which the data packets received are less. The threshold value defined for the site data packet availability 303 is shown below:

$$\text{Threshold value} = (24*(60/\text{packet frequency (minute)}))*92/100 \qquad \text{I}$$

The daily consumption pattern 305 parameter includes information about a distributed site energy consumption data 201 for a day. In an embodiment, the energy management system 101 indicates the users whenever the energy consumption data for a distributed site for a day is less than 10% or greater than 20% from the average consumption for a specific selected period. Further, the daily consumption pattern 305 parameter also includes the number of days whenever distributed site consumption is not within the defined limits.

The weekly consumption pattern 307 parameter includes information about a distributed site energy consumption data 201 for a week. In an embodiment, the energy management system 101 indicates the user whenever there is a 10% variation from minimum to maximum consumption of energy in a week.

Figure 4:
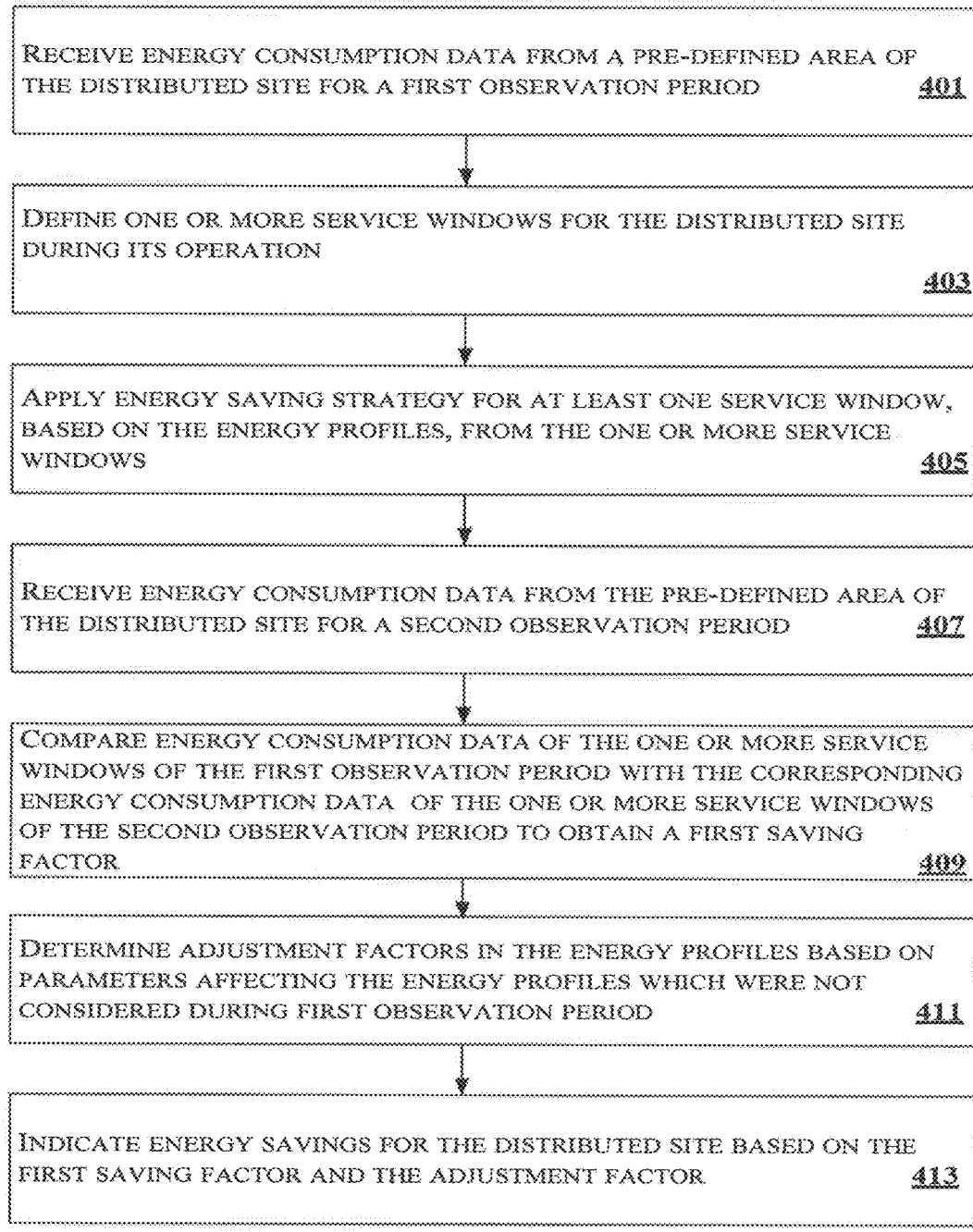
FIG. 4 illustrates a flowchart showing a method for indicating energy savings for a distributed site in accordance with some embodiments of present disclosure.

FIG. 4 illustrates a flowchart showing a method for indicating energy savings for a distributed site in accordance with some embodiments of present disclosure.

As illustrated in FIG. 4, the method 400 comprises one or more blocks for indicating energy savings for a distributed site. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

The energy savings for a distributed site is indicated based on the observation of the energy profiles for the distributed site and applying necessary saving strategy in order to indicate the energy savings for the site.

At block 401, the energy management system 101 receives energy consumption data from a pre-defined area of the distributed site for a first observation period. The first observation period, for example, could be 1 day, 1 week, 1 month, or any given number of days. In one embodiment the first observation period could be in hours.

At block 403, the energy management system 101 defines one or more service windows for the distributed site during its operation. The widows are defined based on the pre-defined area or energy consumption pattern.

At block 405, the energy management system 101 applies energy saving strategy for at least one service window, based on the energy profiles, from the one or more service window.

At block 407, the energy management system 101 receives energy consumption data for a pre-defined area of the distributed site for a second observation period. The second observation period is the period for which energy saving has to be determined. In one embodiment the second observation period could be periodic, for example, weekly, monthly, daily etc.

At block 409, the energy management system 101 compares energy consumption data of the one or more service windows of the first observation period with the corresponding energy consumption data of the one or more service windows of the second observation period to obtain a first saving factor.

At block 411, the energy management system 101 determines adjustment factors in the energy profiles based on parameters affecting the energy profiles which were not considered during first observation period.

At block 413, the energy management system 101 indicates energy savings for the distributed site based on the first saving factor and the adjustment factor.

Figure 5:
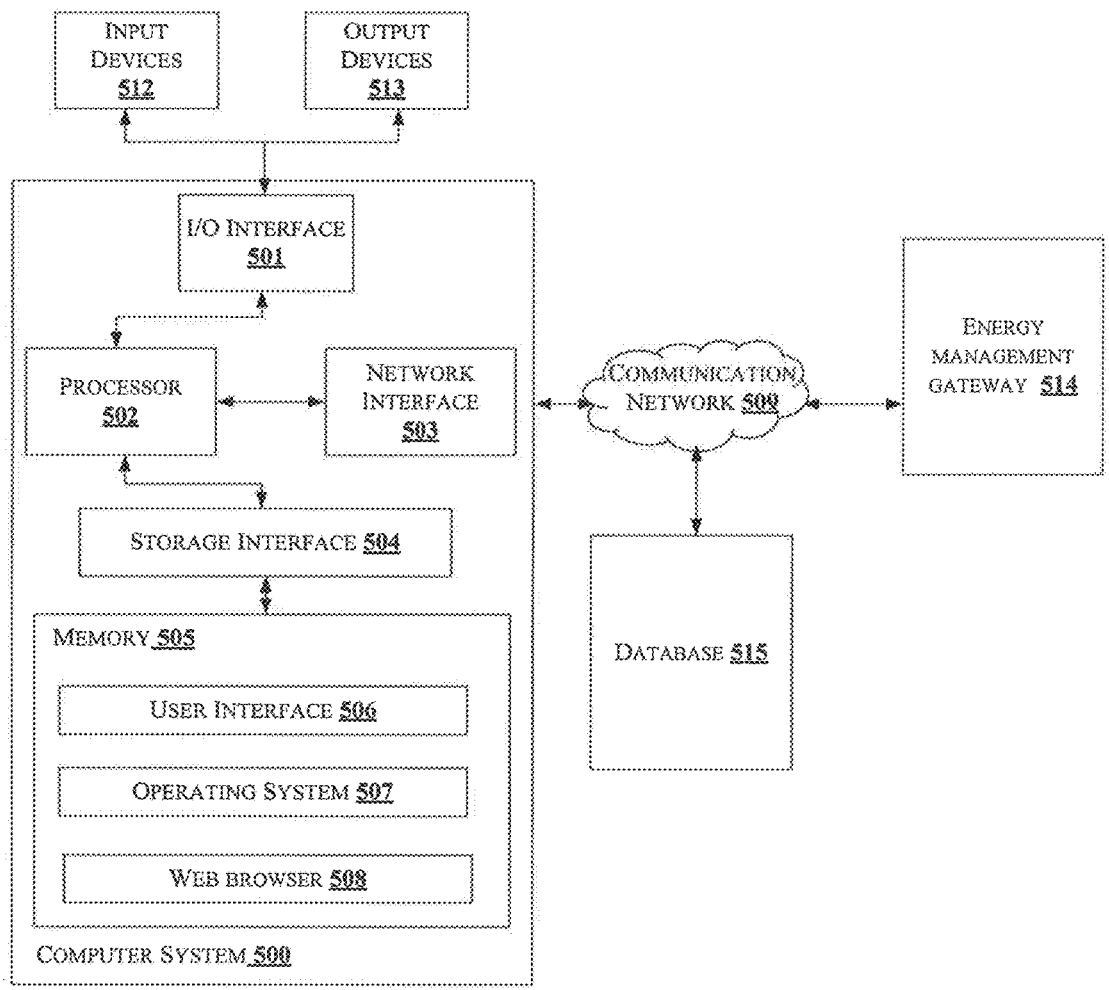
FIG. 5 illustrates a block diagram of an exemplary computer system for implementing embodiments consistent with the present disclosure.

FIG. 5 illustrates a block diagram of an exemplary computer system for implementing embodiments consistent with the present disclosure.

Computing System

FIG. 5 illustrates a block diagram of an exemplary computer system 500 for implementing embodiments consistent with the present disclosure. In an embodiment, the computer system 500 is used to implement the energy management system 101. The computer system 500 may comprise a central processing unit ("CPU" or "processor") 502. The processor 502 may comprise at least one data processor for indicating the energy savings for a distributed site. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of an energy management system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with the energy management gateway 514 and database 515. The network interface 503 may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 4) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure indicates energy savings for a distributed site thus help in energy management associated with a site.

An embodiment of the present disclosure provides one or more adjustment factors in the energy saving process, which helps to detect the effective energy saving strategy.

An embodiment of the present disclosure tracks the effectiveness of the saving measures indicated for the distributed site.

An embodiment of the present disclosure provides real-time monitoring of the energy consumption pattern for the distributed sites, which provides effective energy savings.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals

| Reference Number | Description |
| --- | --- |
| 100 | Environment |
| 101 | Energy management system |
| 103 | Energy management gateway |
| 103A | Site interface |
| 103B | System interface |
| 105 | Site instrumentation unit |
| 105A | Energy control meters and sub-meters |
| 105B | Sensors |
| 105C | Override switches |
| 105D | Communication module |
| 107 | Database |
| 109 | Communication network |

| Reference Number | Description |
|---|---|
| 111 | I/O interface |
| 113 | Memory |
| 115 | Processor |
| 200 | Data |
| 201 | Site energy consumption data |
| 203 | First observation period data |
| 205 | Service window data |
| 207 | Energy saving strategy data |
| 209 | Second observation period data |
| 211 | Adjustment factor data |
| 213 | Energy saving data |
| 215 | Other data |
| 217 | Modules |
| 219 | Receiving module |
| 221 | First observation period module |
| 223 | Service window identification module |
| 225 | Energy saving strategy module |
| 227 | Second observation period module |
| 229 | Adjustment factor determination module |
| 231 | Energy saving indication modules |
| 233 | Other modules |

What is claimed is:

1. A method for indicating energy savings for a distributed site, the method comprising:
   receiving, by an energy management system, energy consumption data from a predefined area of the distributed site for a first observation period;
   defining, by the energy management system, one or more service windows for the distributed site during its operation, wherein each of the one or more service windows comprises one or more unique energy profiles based on a type of the distributed site, at least one energy profile of the one or more unique energy profiles being associated with the pre-defined area;
   applying, by the energy management system, an energy saving strategy for at least one of the one or more service windows, based on the at least one energy profile associated with the pre-defined area;
   receiving, by the energy management system, energy consumption data from the predefined area of the distributed site for a second observation period different from the first observation period and subsequent to the first observation period, the second observation period occurring after applying the energy saving strategy;
   comparing, by the energy management system, the energy consumption data for the first observation period with corresponding energy consumption data for the second observation period after application of the energy saving strategy to obtain a saving factor;
   determining, by the energy management system, one or more adjustment factors in the at least one energy profile associated with the pre-defined area based on parameters affecting the at least one energy profile which were not considered during the first observation period; and
   indicating, by the energy management system, energy savings for the pre-defined area based on the saving factor and the one or more adjustment factors
   wherein the one or more adjustment factors include (i) at least one of addition and deletion of one or more assets of the distributed site after the first observing period and (ii) change in temperature leading to variations in the energy saving in the second observation period.

2. The method as claimed in claim 1, wherein the one or more service windows are defined based on non-business hours, customers hours, peak hours and business hours of the distributed site.

3. The method as claimed in claim 1, wherein the one or more service windows for the distributed site are determined based on the energy profiles which vary based on the distributed site.

4. The method as claimed in claim 1, wherein the energy saving strategy includes control measures for the distributed site based on the one or more service windows defined.

5. The method as claimed in claim 1, further comprising validating the energy consumption data received from the pre-defined area of the distributed site for the first and second observation period.

6. An energy management system for indicating energy savings for a distributed site, comprising:
   a processor; and
   a memory communicatively coupled to the processor, wherein the memory stores processor instructions, which, on execution, causes the processor to:
      receive energy consumption data from a pre-defined area of the distributed site for a first observation period;
      define one or more service windows for the distributed site during its operation, wherein each of the one or more service windows comprises one or more unique energy profiles based on a type of the distributed site, at least one energy profile of the one or more unique energy profiles being associated with the pre-defined area;
      apply an energy saving strategy for at least one of the one or more service windows, based on the at least one energy profile associated with the pre-defined area;
      receive energy consumption data from the pre-defined area of the distributed site for a second observation period different from the first observation period and subsequent to the first observation period, the second observation period occurring after applying the energy saving strategy;
      compare the energy consumption data the first observation period with corresponding energy consumption data for the second observation period after application of the energy saving strategy to obtain a saving factor;
      determine one or more adjustment factors in the at least one energy profile associated with the pre-defined area based on parameters affecting the at least one energy profile which were not considered during the first observation period; and
      indicate energy savings for the pre-defined area based on the saving factor and the one or more adjustment factors;
      wherein the one or more adjustment factors include (i) at least one of addition and deletion of one or more assets of the distributed site after the first observing period and (ii) change in temperature leading to variations in the energy saving in the second observation period.

7. The energy management system as claimed in claim 6, wherein the one or more service windows are defined based on non-business hours, customers hours, peak hours and business hours of the distributed site.

8. The energy management system as claimed in claim 6, wherein the one or more service windows for the distributed site are determined based on the energy profiles which vary based on the distributed site.

9. The energy management system as claimed in claim 6, wherein the energy saving strategy includes control measures for the distributed site based on the one or more service windows defined.

10. The energy management system as claimed in claim 6, wherein the processor validates the energy consumption data received from the pre-defined area of the distributed site at the first and second observation period.

11. A non-transitory computer readable medium including instruction stored thereon that when processed by at least one processor cause an energy management system to perform operations comprising:
   receiving energy consumption data from a predefined area of the distributed site for a first observation period;
   defining one or more service windows for the distributed site during its operation, wherein each of the one or more service windows comprises one or more unique energy profiles based on a type of the distributed site, at least one energy profile of the one or more unique energy profiles being associated with the pre-defined area;
   applying an energy saving strategy for at least one of the one or more service windows, based on the at least one energy profile associated with the pre-defined area;
   receiving energy consumption data from the predefined area of the distributed site for a second observation period different from the first observation period and subsequent to the first observation period the second observation period occurring after applying the energy saving strategy;
   comparing the energy consumption data for the first observation period with corresponding energy consumption data for the second observation period after application of the energy saving strategy to obtain a saving factor;
   determining one or more adjustment factors in the at least one energy profile associated with the pre-defined area based on parameters affecting the at least one energy profile which were not considered during the first observation period; and
   indicating energy savings for the pre-defined area based on the saving factor and the one or more adjustment factors;
   wherein the one or more adjustment factors include (i) at least one of addition and deletion of one or more assets of the distributed site after the first observing period and (ii) change in temperature leading to variations in the energy saving in the second observation period.

12. The medium as claimed in claim 11, wherein the one or more service windows are defined based on non-business hours, customers hours, peak hours and business hours of the distributed site.

13. The medium as claimed in claim 11, wherein the instruction causes the processor to determine one or more service windows for the distributed site based on the energy profiles which vary based on the distributed site.

14. The medium as claimed in claim 11, wherein the energy saving strategy includes control measures for the distributed site based on the one or more service windows defined.

15. The medium as claimed in claim 11, wherein the instruction further causes the processor to validate the energy consumption data received from the pre-defined area of the distributed site for the first and second observation period.

* * * * *